United States Patent
Gamfeldt

(10) Patent No.: US 10,527,497 B2
(45) Date of Patent: Jan. 7, 2020

(54) INFRARED IMAGING DETECTOR

(71) Applicant: IRnova AB, Kista (SE)

(72) Inventor: Anders Gamfeldt, Kista (SE)

(73) Assignee: IRnova AB, Kista (SE)

( * ) Notice: Subject to any disclaimer, the term of this patent is extended or adjusted under 35 U.S.C. 154(b) by 189 days.

(21) Appl. No.: 15/576,401

(22) PCT Filed: May 22, 2015

(86) PCT No.: PCT/EP2015/061432
§ 371 (c)(1),
(2) Date: Nov. 22, 2017

(87) PCT Pub. No.: WO2016/188555
PCT Pub. Date: Dec. 1, 2016

(65) Prior Publication Data
US 2019/0187000 A1    Jun. 20, 2019

(51) Int. Cl.
*G01J 5/08* (2006.01)
*G01J 5/00* (2006.01)
(Continued)

(52) U.S. Cl.
CPC ............ *G01J 5/0846* (2013.01); *G01J 5/0014* (2013.01); *G01J 5/0862* (2013.01); *G01J 5/10* (2013.01);
(Continued)

(58) Field of Classification Search
CPC ...... G01J 5/0846; G01J 5/0014; G01J 5/0862; G01J 5/10; G01J 2005/0077; G01J 5/58;
(Continued)

(56) References Cited

U.S. PATENT DOCUMENTS 4,725,733 A * 2/1988 Horman ................ G01J 5/0014
250/330
4,956,555 A  9/1990 Woodberry
(Continued)

FOREIGN PATENT DOCUMENTS

CN    1969180 A    5/2007
EP    0354066 A2   2/1990
(Continued)

OTHER PUBLICATIONS

Office Action for Chinese Application No. 201580081261.3, dated Apr. 30, 2019 with English summary, 14 pages.
(Continued)

*Primary Examiner* — David P Porta
*Assistant Examiner* — Blake C Riddick
(74) *Attorney, Agent, or Firm* — Brake Hughes Bellermann LLP

(57) ABSTRACT

The present specification generally relates to the field of imaging device and particularly discloses an imaging device for detecting infrared radiation. The imaging device comprises a first set of detectors responsive to infrared electromagnetic radiation in a first wavelength band, a second set of detectors and a filter disposed above the second set of detectors to prevent registration of electromagnetic radiation outside a second wavelength band at the second set of detectors. The second wavelength band is a subset of the first wavelength band. The imaging device is configured to detect a deviation from an expected value of a level of electromagnetic radiation in a third wavelength band based on signals obtained from the first set of detectors and the second set of detectors. The third wavelength band is within the first wavelength band and outside the second wavelength band.

28 Claims, 4 Drawing Sheets

(51) Int. Cl.
  *G01J 5/58* (2006.01)
  *G01J 5/10* (2006.01)

(52) U.S. Cl.
  CPC ......... *G01J 5/58* (2013.01); *G01J 2005/0077* (2013.01); *G01J 2005/106* (2013.01)

(58) Field of Classification Search
  CPC .. G01J 2005/106; A61B 6/4241; A61B 6/032; A61B 6/482; A61B 6/502; G01B 15/045; G01T 1/24
  USPC ...... 250/338.1, 338.4, 338.5, 339.01, 339.02
  See application file for complete search history.

(56) References Cited

U.S. PATENT DOCUMENTS

| | | | |
|---|---|---|---|
| 5,072,109 A | 12/1991 | Aguilera, Jr. et al. | |
| 5,157,258 A | 10/1992 | Gunning, III et al. | |
| 5,306,913 A | 4/1994 | Noack et al. | |
| 5,719,396 A * | 2/1998 | Jack | G01N 21/3504 250/338.5 |
| 6,211,521 B1 | 4/2001 | Bawolek et al. | |
| 6,455,854 B1 * | 9/2002 | Richman | G01N 21/314 250/339.01 |
| 6,657,195 B1 * | 12/2003 | Martin | B82Y 20/00 250/339.01 |
| 6,825,470 B1 * | 11/2004 | Bawolek | G02B 5/201 250/226 |
| 7,375,814 B2 * | 5/2008 | Reichardt | G01M 3/20 250/330 |
| 7,615,750 B2 * | 11/2009 | Dupont | B60T 8/172 250/339.01 |
| 8,124,936 B1 | 2/2012 | Lagna | |
| 8,559,721 B1 | 10/2013 | Bartholomew | |
| 2005/0133690 A1 | 6/2005 | Higashitsutsumi | |
| 2005/0189492 A1 | 9/2005 | Milton | |
| 2006/0091310 A1 | 5/2006 | Furry | |
| 2008/0231946 A1 | 9/2008 | Scott et al. | |
| 2008/0251724 A1 * | 10/2008 | Baliga | G01J 3/02 250/338.5 |
| 2008/0283753 A1 * | 11/2008 | Jensen | G01J 3/36 250/339.02 |
| 2010/0133435 A1 | 6/2010 | Maillart et al. | |
| 2011/0069189 A1 | 3/2011 | Venkataraman et al. | |
| 2011/0085708 A1 * | 4/2011 | Martin | G06K 9/00033 382/115 |
| 2012/0273680 A1 * | 11/2012 | Furry | G01N 33/0036 250/330 |
| 2015/0041660 A1 | 2/2015 | Tröllsch | |

FOREIGN PATENT DOCUMENTS

| | | |
|---|---|---|
| JP | 2008-128792 A | 6/2008 |
| WO | 2005/121751 A1 | 12/2005 |
| WO | 2010/137226 A1 | 12/2010 |

OTHER PUBLICATIONS

Extended European Search Report issued in EP Application No. 19171573.9 dated Sep. 27, 2019, 10 pages.

* cited by examiner

INFRARED IMAGING DETECTOR

CROSS REFERENCE TO RELATED APPLICATION

This application is a 35 U.S.C. § 371 National Phase Entry Application from PCT/EP2015/061432, filed May 22, 2015, and designating the U.S., the disclosure of which is incorporated herein in its entirety by reference.

TECHNICAL FIELD

The present specification generally relates to the field of imaging devices and particularly to an imaging device based on detection of infrared radiation.

TECHNICAL BACKGROUND

All objects with a temperature above absolute zero emit heat energy in the form of radiation. An infrared sensor is a device used to sense infrared radiation. Using a pixelated infrared sensor such as in for instance an infrared camera, an image can be obtained using infrared radiation instead of visible light. Infrared radiation ranges from approximately 0.75 micrometers to 1000 micrometers and the spectral selectivity of a pixelated infrared sensor may be limited by means of a pass-band filter determining a wavelength band of operation of the pixelated infrared sensor.

Infrared cameras may be used in a wide range of applications such as security and defense as well as industrial applications. In particular, infrared cameras may be used for gas detection applications or various types of surveying applications wherein a substance (such as a gas) to be detected emits, reflects and/or absorbs infrared radiation within a specific wavelength band. However, the information provided by current infrared imaging sensors is still limited and a number of processing steps may be required for determining presence of such substance in an image captured by the imaging sensor. In general, imaging sensors providing a more reliable detection are desired. For at least those reasons, there is still a need of improved infrared imaging sensors.

SUMMARY

An object of at least some embodiments of the present disclosure is to wholly or partly overcome at least some of the above disadvantage(s) of prior art infrared imaging sensors and to provide an improved imaging device.

This and other objects are achieved by means of the imaging device according to the independent claim. Preferred embodiments are set forth in the dependent claims.

According to an embodiment, an imaging device is provided. The imaging device comprises a first set of detectors, a second set of detectors and a filter. The first set of detectors is responsive to infrared electromagnetic radiation in a first wavelength band. The filter may be disposed above the second set of detectors to prevent registration of electromagnetic radiation outside a second wavelength band at said second set of detectors. The second wavelength band is a subset of the first wavelength band. The imaging device may be configured to detect a deviation from an expected value of a level of electromagnetic radiation in a third wavelength band based on signals obtained from the first set of detectors and the second set of detectors. The third wavelength band is within the first wavelength band and outside the second wavelength band.

In the present embodiment, spectral filtering is provided at least partly by means of the filter disposed above (or on top of) the second set of detectors. The filter may for example function as a pass-band filter in that electromagnetic radiation of the second wavelength band is transmitted to the second set of detectors while electromagnetic radiation outside the second wavelength band is attenuated or blocked (is not transmitted). However, this is only one example and the filter may also be a high-pass filter or a low-pass filter, thereby determining one boundary of the second wavelength band, the other boundary being determined by the spectral sensitivity of the detectors of the second set or by any additional filter. In the imaging device of the present embodiment, the detectors of the second set are configured to register electromagnetic radiation within the second wavelength band.

With this filter, the second set of detectors is configured to register or detect electromagnetic radiation of a second wavelength band which is a subset of (i.e. narrower than) the first band of wavelengths to which the first set of detectors is responsive (or is configured to register). Rather than being configured to provide information about electromagnetic radiation of the second wavelength band, the imaging device of the present embodiment is configured to provide information about a third wavelength band which is within the first wavelength band but outside the second wavelength band. The region, or wavelength band, of interest is therefore outside the wavelength band at least partly determined by the filter. In other words, the imaging device is configured to provide information about a wavelength band for which the second set of detectors, on top of which a filter is disposed, is not responsive (or is not configured to register electromagnetic radiation), at least partly because of the presence of the filter.

It will be appreciated that in some embodiments, the first set of detectors and the second set of detectors may both be, as such, sensitive to the first wavelength band in that the detectors themselves may be sensitive to the first wavelength band. This could for example be the case if the first set of detectors and the second set of detectors are made of the same material for forming a pixelated solid-state sensor. However, in the imaging device of the present embodiment, the detectors of the second set of detectors do not provide signals representative of the full width of the first wavelength band because of the presence of the filter. Using different arrangements, as will be explained in more detail in further embodiments, in the imaging device, the first set of detectors is configured to register electromagnetic radiation within the first wavelength band while the second set of detectors is configured to register electromagnetic radiation within the second wavelength band. With the term register, it is meant that in the imaging device, a detector (or set of detectors) is configured to provide a signal for a specific wavelength band while it will be less (and possibly not) responsive to electromagnetic radiation having wavelengths outside this specific wavelength band.

As the third wavelength band is within the first wavelength band, the first set of detectors do not directly correspond to information about the third wavelength band. However, signals obtained from the detectors of the first set of detectors include information about electromagnetic radiation within the third wavelength band (and the second wavelength band). As the third wavelength band corresponds to the difference between the first wavelength band and the second wavelength band (i.e. the first wavelength band without the second wavelength band), the imaging device can be configured to provide information about electromagnetic radiation in the third wavelength band based on signals obtained by the first set of detectors and the second set of detectors.

In particular, the imaging device of the present embodiment may be configured to detect a deviation from an expected value of a level (or amplitude) of electromagnetic radiation in the third wavelength band based on the signals obtained from the first set of detectors and the second set of detectors.

The first set of detectors and the second set of detectors may be arranged in a common plane. For example, the first set of detectors and the second set of detectors may be arranged in a two dimensional array to form the basic structure of the imaging device. It will be appreciated that the detectors may in some embodiments also be referred to as pixels of the imaging device such that the imaging device is pixelated. Some of the pixels may belong to the first set of detectors (i.e. corresponding to a first group, or set, of pixels) while other pixels may belong to the second set of detectors (i.e. corresponding to a second group, or set, of pixels). In the following, reference may therefore be made to a pixel or pixels of the first set, or the second set, instead of a detector or detectors of the first set, or the second set.

With the imaging device of the present embodiment, a more reliable detection is obtained since it is a deviation from an expected value of the level of electromagnetic radiation in the third wavelength band that is detected. The deviation is representative of a difference between a signal indicative of the level of electromagnetic radiation in the third wavelength band, as may be derived from a signal obtained from one detector of the first set of detectors, and the expected value, as may be derived from signal(s) obtained from one or more detectors of the second set of detectors. Thus, if there is a deviation from the expected value, as may be illustrated by a positive or negative difference between a value related to the signal obtained from a detector of the first set of detectors and a value related to the signal(s) obtained from one or more surrounding detectors of the second set of detectors, as will be explained in more detail in the following, then presence of a substance having for example an absorption peak (or a transmission peak or a reflectance peak) within the third wavelength band is detected. With the imaging device of the present embodiment, a direct detection of the substance is achieved in that the deviation is indicative of electromagnetic radiation in the third wavelength band only. The first wavelength band and the second wavelength band may therefore be adjusted to achieve an imaging device sensitive in a specific third wavelength band characteristic of a specific substance. A more reliable and/or accurate detection is obtained in that the deviation from the expected value is representative of the properties of the substance in the third wavelength band only.

In comparison, in prior art imaging sensors wherein all or some pixels may be equipped with a band-pass filter for detecting electromagnetic radiation of a specific wavelength band, a signal obtained from such pixels may be occasioned by a substance having an absorption peak within the specific wavelength band only but may also be occasioned by any other objects, for example flying objects such as a bird, providing electromagnetic radiation in a broader range of wavelengths including the specific wavelength band. Thus, detection of a signal at a pixel in such prior art imaging sensors may not only be characteristic of a substance having an absorption peak in the third wavelength band only but also any object presenting absorbing/emitting properties in a wider range of wavelengths than just the third wavelength band. Such prior art imaging sensors may therefore require a rather complicated and time-consuming processing of the images, either via a computer or via an operator, in order to identify whether the contribution of electromagnetic radiation originates from the substance to be identified or from another source. In for example gas detection applications, it may be required that an operator observes the captured image(s) to investigate whether the detected signal originates from a gas cloud or another object (such as a bird or other sources) emitting also infrared radiation within the specific wavelength band of interest. Further, prior art imaging sensors suffer from not having a reference level for the signals in the pixels such that a signal level in a pixel cannot be associated with presence of a gas. The use of such sensors is therefore limited when imaging for instance gas saturated environments since there is no area without gas to refer to or for comparing a signal level with another.

In contrast, in the imaging device of the present embodiment, detecting the deviation of the level (or amplitude) of electromagnetic radiation in the third wavelength band based on the signals obtained by the first set of detectors and the second set of detectors allows for presence detection of a substance having contributed to the signal only because of electromagnetic radiation in the third wavelength band. Thus, with the imaging device of the present embodiment, the risk of error detection, in the sense that a signal may be obtained from other sources than the substance of interest (i.e. the substance the imaging device is configured to detect), is reduced (and possibly eliminated).

In the present embodiment, if an object contributes to a signal in the third wavelength band and the second wavelength band, the contribution of this object in the third wavelength band will be suppressed as the imaging device is configured to detect the deviation from the expected value based on the signals from the first set of detectors and the second set of detectors. In other words, it will be identified that it has also contributed to the signal in the second wavelength band since the first set of detectors is responsive to electromagnetic radiation in the first wavelength band (covering both the second wavelength band and the third wavelength band) and the second set of detectors is responsive to electromagnetic radiation in the second wavelength band.

For applications in which a gas having an absorption peak (or a transmission peak or a reflectance peak) at a specific wavelength (or within a specific wavelength band) has to be detected, detecting deviation from the expected value in the specific wavelength band corresponds to having an own channel for detection of the gas, i.e. looking only at the contribution of the gas. As such, the detection becomes more automatic in that presence of the substance may be directly detected at a specific pixel (or detector of the first set of detectors), i.e. a specific channel, via detection of the deviation from the expected value and thus less post-processing of the captured image is required.

Further, the imaging device of the present embodiment is advantageous over prior art imaging sensors (in that detection in a gas saturated environment is possible since the signal level in a pixel of the first group of pixels is related to a signal level of a background as detected by one or more of the pixels of the second group of pixels.

In one embodiment, at least one detector of the second set of detectors may be configured to generate a reference signal corresponding to a background level of electromagnetic radiation in the second wavelength band and the expected value may be derived from the reference signal. It will be appreciated that the background level (or level of background electromagnetic radiation) in the third wavelength band may not directly correspond to the signal level in the second wavelength band but may at least be obtained from (or based on) signals from one or a plurality of detectors of the second set of detectors.

In a particular embodiment, for detecting presence of electromagnetic radiation at a certain pixel of the imaging detector (i.e. a certain pixel of the first set), the background level may be obtained from reference signals obtained by detectors of the second set of detectors surrounding this certain pixel of the first set. In the array of detectors, different expected values may be used for different pixels of the first set.

The expected value may be derived from the reference signal(s) and may therefore be representative of the background level of electromagnetic radiation of the area surveyed or imaged by (a pixel or detector of the first set of detectors of) the imaging device. A deviation from the background level in signals obtained by detectors of the first set of detectors may then be detected. Any such deviation will be representative of the presence of a substance having an absorption peak (or transmission peak or reflectance peak) in the third wavelength band. Further, as the expected value is determined based on measurements performed by the second set of detectors, a real time adaptation to the actual conditions is obtained. Consequently, a more reliable and accurate imaging is achieved.

It will be appreciated that in the present embodiments, for a captured image, the signals obtained by the pixels of the first set may be compensated for the contribution of the background electromagnetic radiation such that the resulting signals indicate presence of electromagnetic radiation different from the background, such as e.g. because of a gas, in the third wavelength band.

In one embodiment, the expected value may correspond to (or may be derived from) background electromagnetic radiation of a known spectral distribution in the third wavelength band. In particular, the known spectral distribution may correspond to radiation from a black body radiator, a grey body radiator and/or a light source. For example, the background may be assumed to be a black body radiator having a certain body temperature, thereby providing a particular spectral distribution (Planck curve). The spectral distribution of the electromagnetic radiation provided by the background imaged by the imaging sensor may be known such that the expected value in the third wavelength band may be derived based on this spectral distribution and one or more signals obtained from the second set of detectors. The second set of detectors provide background information in the second wavelength band so the background information in the third wavelength band can be determined based on the known spectral distribution and the signals from the second set of detectors. It will be appreciated that, in some embodiments, a light source may be used to illuminate the object imaged by the imaging sensor in order to increase the signal levels.

In one embodiment, the first set of detectors may be configured to generate a measurement signal and the imaging device may be configured to determine the deviation based on the expected value and the measurement signal. The detectors of the first set generate signals corresponding to electromagnetic radiation from the first wavelength band which includes the third wavelength band and the second wavelength band. As the third wavelength band is the wavelength band of interest, the first set of detectors provide measurement signals which can be compensated for by the background level of electromagnetic radiation in the third wavelength band, i.e. the expected value, in order to detect a deviation from the expected value and thereby presence of a substance having a characteristic in the third wavelength band which the imaging device is configured to detect.

In one embodiment, a deviation from the expected value indicates presence of a medium or substance within a field of view of the imaging device. The medium or substance may have an absorption peak, a transmission peak and/or a reflectance peak within the third wavelength band.

In the absence of a substance in the field of view of the imaging device, the measurement signal or a corrected value of the measurement signal will be equal or similar to the expected value. On the other hand, in the presence of a substance having a characteristic in the third wavelength band, a deviation of the measurement signal (or a corrected value of the measurement signal) from the expected value will be detected. A characteristic of the substance in the third wavelength band may be a spectral property in the band of interest, such as any or a combination of an absorption peak, a transmission peak and/or a reflectance peak.

In one embodiment, the imaging device may be configured to detect an amount of substance or medium in that an amount of deviation from the expected value is indicative of an amount of medium or substance having an absorption peak, a transmission peak and/or a reflectance peak in the third wavelength band. The imaging device may at least provide a relative measurement of the amount of the substance from one detector (or pixel) to another.

In one embodiment, the medium or substance may be a gas. It will be appreciated that the imaging device may be configured to image a volume or a surface such that it is configured to detect a substance or medium at such surface (like skin in medical applications) or within such volume (like a building, a wall, a pipe in industrial applications or others). For example, in backlit applications for gas detection, the back light or background may correspond to the expected value and the electromagnetic radiation corresponding to the absorption wavelength of the gas will result in an absorption that in turn affects the measurement signal and provides a deviation from the expected value.

The gas may be any gas having an absorption peak in the third wavelength band. The third wavelength band may be suited to any specific gas by adjusting the first wavelength band and the second wavelength band. The gas may for an example be butane, propane or any other volatile organic compound (VOC) gas. Other examples of gas may be Sulfur hexafluoride ($SF_6$).

In one embodiment, the expected value may correspond to a reference signal obtained by at least one detector of the second set of detectors and scaled in accordance with a known dependence of the background level of infrared radiation in the second wavelength band. The reference signal obtained by at least one detector of the second set of detectors represents the level of electromagnetic radiation provided by the background of the imaged environment (i.e. the background in the field of view of the imaging detector) in the second wavelength band. As the wavelength band of interest is the third wavelength band, the expected value does not directly correspond to such reference signal. Instead, via a known dependence of the background level of infrared radiation in the second wavelength band and interpolation, the reference signal may be scaled such that it corresponds to the background level in the third wavelength band, thereby resulting in the expected value form which the deviation may be detected.

In one embodiment, the second wavelength band may represent a window corresponding to longer wavelengths of the first wavelength band. In some other embodiments, the second wavelength band may represent a window corresponding to shorter wavelengths of the first wavelength band. It will be appreciated however that the determination of the expected value from the signals of the second set of detectors is more accurate if the second wavelength band represents a window corresponding to higher signal levels which can allow for a spectrally narrower band without compromising the signal to noise ratio of said band. This in turn depends on the nature of the background radiation and the temperature of the observed body or environment. A certain black body radiator for instance will at a given body temperature presents a certain intensity distribution as a function of the wavelength. The distribution may be a Planck curve and may for instance be increasing at shorter wavelengths or decreasing at longer wavelengths. Depending on the position of the desired third wavelength band (as determined by the absorbing, transmitting or reflecting properties of the substance to be detected) the imagining device may be designed such that the second wavelength band is positioned at the left hand side (i.e. at shorter wavelengths) of the third wavelength band or the opposite. Thus, the positioning of the second wavelength band may depend on the derivative of the Planck curve for a given body (environment) and temperature. The second wavelength band may also be designed to provide a narrower band such that the level of background electromagnetic radiation in the second wavelength band becomes closer to the expected level of background electromagnetic radiation in the third wavelength band.

In some embodiments, the first set of detectors and the second set of detectors may be arranged in a checker board pattern.

The filter may be any type of filter such that only electromagnetic radiation of the second wavelength band can be registered at the second set of detectors. In some embodiments, the filter may be an interference filter. For example, the filter may include at least one of the following material amorphous silicon (aSi), silicon dioxide ($SiO_2$) and silicon nitride ($SiN_2$). The filter may for example be made of aSi and $SiO_2$.

In one embodiment, the filter may be configured to prevent electromagnetic radiation outside a second wavelength band from reaching the second set of detectors. In this embodiment, the filter may be a band-pass filter in that it may only let electromagnetic radiation having wavelengths within a second wavelength band pass through.

In a particular embodiment, the filter may comprise a first filter layer determining an upper boundary of the second wavelength band and a second filter layer determining a lower boundary of the second wavelength band. In other words, the filter may be made of several layers. It will be appreciated that the layers may in some embodiments be arranged adjacent to each other.

In another embodiment, the filter may be configured to transmit electromagnetic radiation above a threshold wavelength determining a lower boundary of the second wavelength band, the upper boundary being determined by the upper boundary of the first wavelength band. In this embodiment, the filter may be a high-pass filter in that it may only transmit electromagnetic radiation having wavelengths above a certain (or threshold) wavelength. The upper boundary of the second wavelength band may then be determined by the spectral sensitivity of the detectors of the second set of detectors or by a filter such as for instance a global filter arranged on top of the imaging device.

In another embodiment, the filter may be configured to attenuate electromagnetic radiation above a threshold wavelength determining an upper boundary of the second wavelength band, the lower boundary being determined by the lower boundary of the first wavelength band. In this embodiment, the filter may be a low-pass filter in that it may only transmit electromagnetic radiation having wavelengths below a certain (or threshold) wavelength. The lower boundary of the second wavelength band may then be determined by the spectral sensitivity of the detectors of the second set of detectors or by a filter such as for instance a global filter arranged on top of the imaging device.

In some embodiments, at least one of the upper boundary and the lower boundary of the first wavelength band may be determined by the spectral sensitivity of the detectors of the first set and the second set.

In all examples and embodiments, a filter may comprise several filter layers from the group of long pass filters, short pass filters, band block filters and/or band pass filters. For example a band pass filter may comprise a long pass filter and a short pass filter, thus effectively resulting in a band pass filter.

In one embodiment, the filter may be positioned in contact with the second set of detectors. In particular, the filter may be arranged in direct physical contact with the second set of detectors.

In one embodiment, the imaging device may comprise an anti-reflecting coating that may be disposed between the filter and the two-dimensional array. The anti-reflecting coating may be a layer applied on the array of detectors. For example, the anti-reflecting coating may include at least one of the following material amorphous silicon (aSi), silicon dioxide ($SiO_2$) and silicon nitride ($SiN_2$). The use of an anti-reflecting coating reduces reflection of incoming infrared radiation and ensures a higher level of signals obtained from the detectors (or pixels) of the array.

In one embodiment, the imaging device may comprise a global filter disposed above the two-dimensional array.

In some embodiments, the global filter may be configured to determine at least one of the upper boundary and the lower boundary of the first wavelength band. The global filter may for example be a low-pass filter thereby determining the upper boundary of the first wavelength band, the other boundary being determined for instance by the spectral sensitivity of the detectors of the first set. In another example, the global filter may be a high-pass filter thereby determining the lower boundary of the first wavelength band, the other boundary being determined for instance by the spectral sensitivity of the detectors of the first set. In yet another example, the global filter may be a band-pass filter.

A global filter may however also be used for protecting the imaging device, for instance for avoiding that electromagnetic radiation of certain wavelengths which may damage the detectors reaches the first set and second set of detectors.

Alternatively, the global filter may be configured to prevent radiation outside a fourth wavelength band from reaching the first set of detectors and the second set of detectors such that the fourth wavelength band may be a subset of the first wavelength band. The imaging device may then be configured to detect a deviation from an expected value of a level of electromagnetic radiation in a third wavelength band that is within the fourth wavelength band and outside the second wavelength band.

In one embodiment, the second wavelength band may cover approximately half of the width of the first wavelength band. A lower or higher boundary of the second wavelength band may be arranged close to a lower or higher boundary of the first wavelength band such that a boundary of the third wavelength band corresponds to the other boundary of the first wavelength band. In other words, the second and the third wavelength band may be arranged adjacent to each other within the first wavelength band. Further, the third wavelength band may correspond to the difference between the first wavelength band and the second wavelength band.

In one embodiment, the first wavelength band may extend from approximately 3.2 micrometers to approximately 3.8 micrometers while the second wavelength band may extend from approximately 3.5 micrometers to approximately 3.8 micrometers. The resulting third wavelength band may then extend from approximately 3.2 micrometers to approximately 3.5 micrometers. Such an imaging device may for example be suitable for detecting volatile organic compound (VOC) gases.

In another embodiment, the first wavelength band may extend from approximately 10.3 micrometers to approximately 10.7 micrometers while the second wavelength band may extend from approximately 10.3 micrometers to approximately 10.5 micrometers. The resulting third wavelength band may then extend from approximately 10.5 micrometers to approximately 10.7 micrometers. Such an imaging device may for example be suitable for detecting $SF_6$.

In one embodiment, the second wavelength band may be positioned relative to the first wavelength band such that a contribution of a background level of electromagnetic radiation in a signal obtained for the second wavelength band is approximately equal to a signal level obtained for the third wavelength band.

In one embodiment, the device may be configured to obtain the deviation by subtracting a measurement signal generated by a detector of the first set of detectors from a corrected mean value of reference signals generated by at least one or some detectors of the second set of detectors surrounding the detector of the first set or by subtracting a corrected measurement signal generated by a detector of the first set of detectors from a mean value of reference signals generated by at least one or some detectors of the second set detectors surrounding the detector of the first set. In the present embodiment, the term "corrected" refers to a correction performed on the measurement to obtain a more accurate value. In particular, the background level detected in the second wavelength band by the pixel(s) of the second set is corrected to obtain (or to correspond to) the background level in the third wavelength band.

In one embodiment, the detectors of the first set of detectors and the second set of detectors are calibrated in order to compensate for variation in gain and/or offset. Here, the term "calibrated" refers to a calibration which may be performed to compensate for variation between detectors (pixels) due to e.g. manufacturing reasons such as variation in thickness of the filter on top of the second set of detectors or variation in sensitivity between various pixels.

In some embodiments, the imaging device may include an optical system (such as e.g. a lens) for altering optical focus in an image captured by the imaging device in order to compensate for spatial displacement between a detector of the first set of detectors (from which a measurement signal may be obtained) and the one or more detectors of the second set of detectors (from which reference signals are used to obtain the expected value corresponding to the detector of the first set).

In one embodiment, an infrared camera comprising an imaging device in accordance with any one of the preceding embodiments is provided.

The present disclosure is for example applicable for infrared optical gas imaging, medical infrared imaging, thermography, non-destructive testing, process control. In general, imaging devices or cameras according to embodiments of the present disclosure may be applicable for detection of substances at surfaces such as, by way of example, diagnostic of skin diseases (skin cancer) or product screening for e.g. identification of old fruits in the food industry. Other than gas and solid substances, the imaging device may be suitable for imaging fluids, such as for detection of oil spills.

In the present application, the term imaging device may interchangeably be replaced with the terms imaging sensor or imaging detector. The imaging device may be arranged with other elements or parts to form an infrared camera.

Further, in some embodiments, an imaging camera including an imaging device in accordance with any one of the preceding embodiments and an additional imaging sensor sensitive to visible light may be provided. The integration of the additional imaging sensor would be particularly advantageous in case an optical system altering the focus of the infrared imaging device is used. In any case, the imaging camera may be configured to provide an image using visible light onto which an indicator or pointer indicates where a substance (e.g. a gas) has been detected. The images captured by the two sensors may be synchronized so that their respective fields of view correspond to each other or at least overlap. The sensors may also be synchronized in time.

It will be appreciated that other embodiments using all possible combinations of features recited in the above described embodiments may be envisaged.

BRIEF DESCRIPTION OF THE DRAWINGS

The invention is described in the following illustrative and non-limiting detailed description of exemplary embodiments, with reference to the appended drawings, wherein.

All figures are schematic, not necessarily to scale, and generally only show parts which are necessary in order to elucidate the invention, wherein other parts may be omitted or merely suggested. Throughout the figures the same reference signs designate the same, or essentially the same features.

DETAILED DESCRIPTION

Exemplifying embodiments will now be described more fully hereinafter with reference to the accompanying drawings, in which currently preferred embodiments are shown.

The invention may, however, be embodied in many different forms and should not be construed as limited to the embodiments set forth herein; rather, these embodiments are provided for thoroughness and completeness, and fully convey the scope of the invention to the skilled person.

Figure 1:
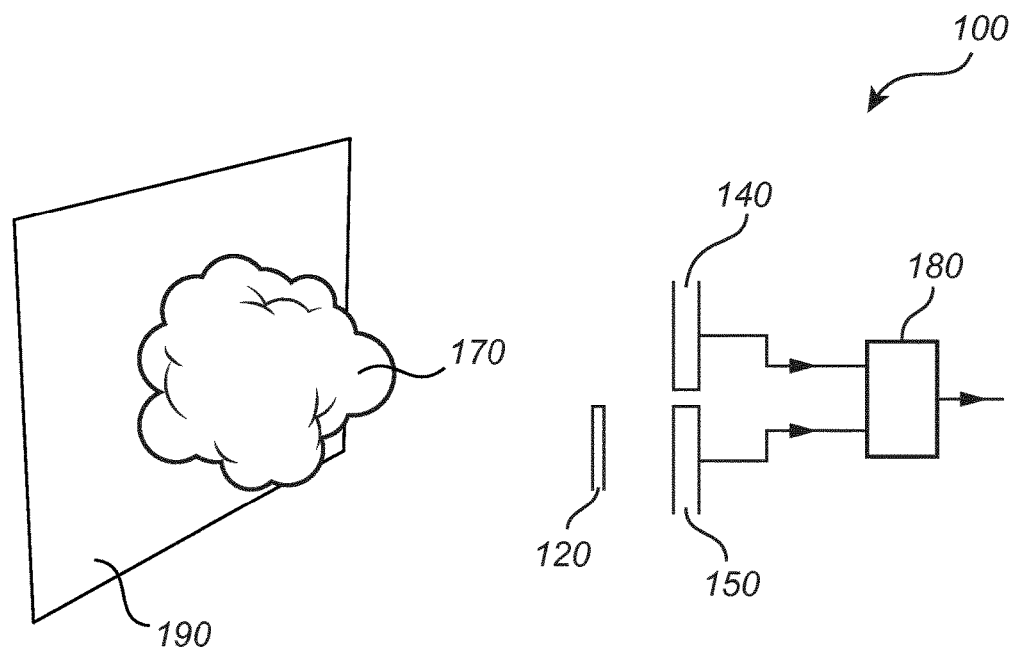
FIG. 1 is a schematic illustration of an imaging device according to a first embodiment.

With reference to FIG. 1, an imaging device according to a first embodiment is described.

FIG. 1 is a schematic illustration of an imaging device 100 including a first set of detectors 140, a second set of detectors 150 and a filter 120. The first set of detectors 140 is responsive to infrared electromagnetic radiation in a first wavelength band. The filter 120 is positioned above the second set of detectors 150 to prevent registration of electromagnetic radiation outside a second wavelength band at the second set of detectors 150. The second wavelength band is a subset of the first wavelength band. The imaging device is then configured to detect electromagnetic radiation in a third wavelength band which is within the first wavelength band and outside the second wavelength band.

It will be appreciated that although the second set of detectors 150 may as such be sensitive to infrared electromagnetic radiation in the first wavelength band (i.e. even outside the second wavelength band), only radiation in the second wavelength band are detected by the detectors (or pixels) of the second set of detectors due to the positioning of the filter 120. Effectively, the first set of detectors 140 detects electromagnetic radiation in the first wavelength band and the second set of detectors 150 detects electromagnetic radiation in the second wavelength band.

In some embodiments, the first set of detectors and the second set of detectors may originate from the same solid state imaging sensor. The detectors of the solid state imaging sensor may for example be sensitive to the first wavelength band and a filter may be applied on top of the detectors of the second set of detectors such that the detectors of the second set of detectors may only register electromagnetic radiation within the second wavelength band.

Further, it will be appreciated that the present embodiment and all other embodiments of the present disclosure may be implemented using any detector technology. By way of example, the first set of detectors and the second set of detectors may be based on type II super lattice detector technology (T2SL), quantum well infrared photodetector technology (QWIP), micro bolometer technology, mercury cadmium telluride (MCT) technology, Indium antimonide (InSb) technology or Indium Gallium Arsenide (InGaAs) technology. Similarly, the spatial resolution or number of pixels in the resulting detector chip may of any size. By way of example, a 320×256 chip may be used but other formats may be used.

The imaging device may then detect a deviation from an expected value of the electromagnetic radiation in the third wavelength band based on signals obtained from the first set of detectors 140 and the second set of detectors 150. For this purpose, the signals obtained by the detectors of the first set of detectors 140 and the second set of detectors 150 may for example be read out by a readout circuit 180.

For illustrative purposes, the imaging device 100 is shown to observe a region or area including a wall 190 in front of which a gas cloud 170 is present. The aim of the imaging device is then to detect presence of gas in the observed region.

The wall 190 may for example have certain reflectance properties and a certain body temperature such that a certain level of infrared radiation is emitted from the wall (and in general from the environment observed by the imaging device 100, i.e. within the field of view of the imaging device 100). The level of electromagnetic radiation present in the observed region because of all elements or objects other than the gas cloud 170 may be referred to as a background level of electromagnetic radiation. This may also include objects, animals or human temporarily placed in the field of view of the imaging device 100.

In the absence of any gas in the observed region, it may then be expected that both detectors from the first set of detectors 140 and detectors from the second set of detectors 150 generate signals corresponding to the background level. Thus, based on these signals, as may be read out by the readout circuit 180 for example, the imaging device 100 may detect that there is no deviation from the expected value and therefore that there is no gas in the observed region.

If a gas is present, however, then infrared radiation having a wavelength corresponding to the absorption peak of the gas (i.e. the third wavelength band) may be altered by the gas. The detectors of the second set of detectors 150 show a signal level as expected since these detectors are configured to detect in the second wavelength band (i.e. not including the third wavelength band). The detectors of the first set of detectors 140 on the other hand will detect a slightly different signal (in case of absorption of infrared radiation by the gas) since the first wavelength band also covers the third wavelength band. The expected value of electromagnetic radiation in the third wavelength band may then be determined based on (at least partly) the signals obtained by the second set of detectors 140. In particular, at least one detector of the second set of detectors 150 may be configured to generate a reference signal corresponding to a background level of electromagnetic radiation in the second wavelength band and the expected value may be derived from such reference signal.

It will be appreciated that the presence of a gas which absorbs within a certain wavelength range (or at a certain absorption peak) may also emit infrared radiation in the same range (or at a wavelength corresponding to the absorption peak). Thus, the present of a gas may not necessarily correspond to a lower signal detected in the pixel corresponding to the position of the gas. Instead, whether the signal will be increased or decreased will depend as to whether the gas emits infrared radiation at a higher intensity than the background, which in turn may depend on the temperature of the gas. In particular, if the gas is warmer than the background environment, then the signal may be higher, and vice versa.

As will be further illustrated in the following, a correction using the dependence of electromagnetic radiation of a black or grey radiator or other light source on the wavelength may be performed to obtain the expected value of background electromagnetic radiation in the third wavelength band from the reference signal(s) of the second set of detectors 150. The signal from a detector of the first set of detectors 140 may then be used to determine whether there is a deviation from the expected value of electromagnetic radiation in the third wavelength band. Detection of a deviation may then indicate presence of a gas in the direction observed by the detector of the first of detectors 140 in question.

Figure 2:
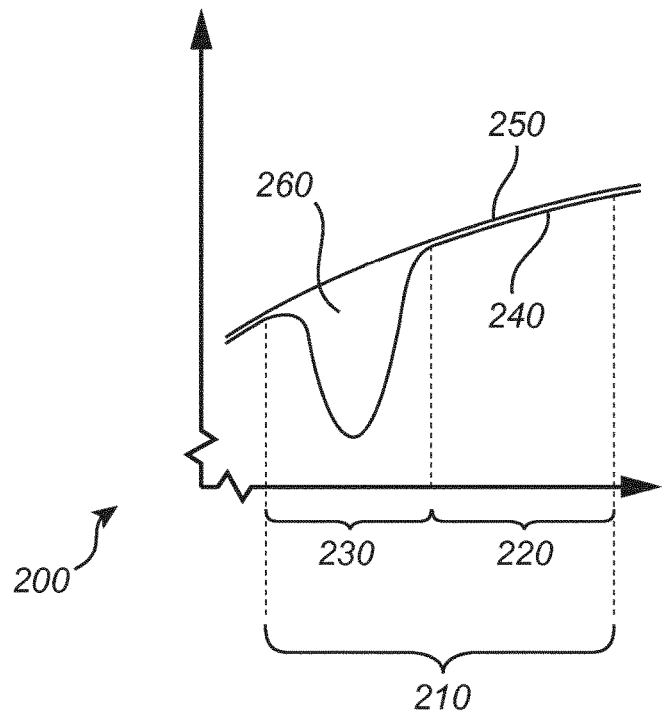
FIG. 2 is a graph explaining the operation principle of an imaging device in accordance with an embodiment.

FIG. 2 shows a graph 200 explaining the operation principle in the detection of an imaging device according to an embodiment. Reference may be made to the imaging device 100 described with reference to FIG. 1.

In the graph 200, the horizontal axis is divided into three wavelength bands, namely a first wavelength band 210, a second wavelength band 220 and a third wavelength band 230. The second wavelength band 220 and the third wavelength band 230 are subsets of the first wavelength band 210.

It will be appreciated that no scale is given as this graph is provided for explanatory purposes.

In the present example, the second wavelength band 220 and the third wavelength band 230 have approximately equal length (or width) on the horizontal axis. The third wavelength band 230 is positioned at lower wavelengths along the horizontal axis than the second wavelength band 220.

The curve 250 shown in graph 200 of FIG. 2 illustrates the dependence of the amplitude (vertical axis) on the wavelength (horizontal axis) for a black body radiator or any other background environment. In other words, the curve denoted 250 illustrates the behaviour of the background level from which the expected value of electromagnetic radiation in the third wavelength band may be derived based on e.g. the signals obtained from a detector of the second set of detectors 150.

The curve 240 shown in the graph 200 illustrates a possible effect of the presence of a gas. As can be seen, if a gas is present with a certain absorption characteristic in the third wavelength band, a deviation denoted 260 from the expected behaviour will be observed. The deviation 260 is present in the third band 230.

In the present example, the curve 240 representing behaviour with presence of gas shows a lower amplitude level than the curve 250 representing the expected behaviour in the third wavelength band 220. A deviation 260 below the expected behaviour is an indication of the presence of a gas which may e.g. absorb radiation from the background (e.g. the wall 190 behind the gas cloud 170) and also emits less radiation than the background. This is however only an example and it depends on the temperature of the gas relative to the temperature of the background. In another example, a deviation corresponding to a higher amplitude level, wherein the gas may also absorb electromagnetic radiation from the background but emit at a higher level, may indicate presence of a gas. The amplitude of the deviation 260 (or deviation peak) is an indication of the amount of absorption in the measured object and thus an indication of the amount (or thickness or concentration) of the object (e.g. a gas) imaged by the imaging device.

It will be appreciated that graph 200 may be considered to illustrate behaviours with and without presence of the image substance such as e.g. a gas, wherein the curve 240 without presence of the substance corresponds to the expected behaviour. As previously mentioned, from a signal obtained by at least one detector of the second set of detectors 150, an expected value may be determined for the level of electromagnetic radiation in the third wavelength band. With reference to e.g. curve 240, the expected value may correspond to electromagnetic radiation of a known spectral distribution in the third wavelength band.

Although FIG. 1 shows an example with a wall as a background environment, the known spectral distribution may generally correspond to radiation from a black body radiator, a grey radiator or a light source.

Figure 3:
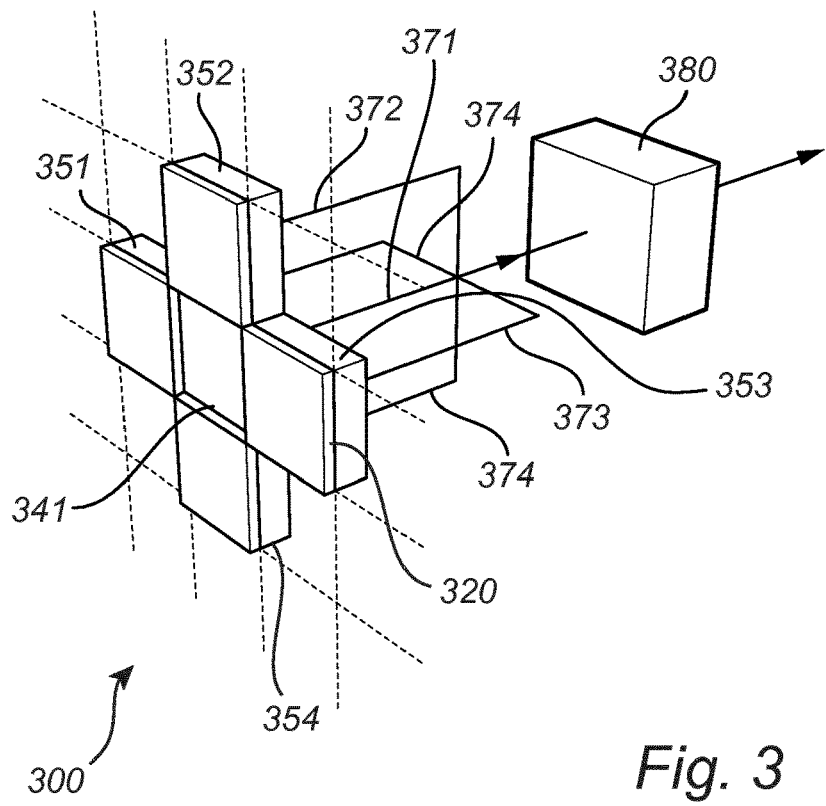
FIG. 3 is a schematic perspective view of an imaging device in accordance with an embodiment.

With reference to FIG. 3, an imaging device according to another embodiment is described.

FIG. 3 shows a schematic perspective view of an imaging device 300 comprising a first set of detectors, a second set of detectors and a filter.

The imaging device 300 shown in FIG. 3 is equivalent to the imaging device 100 described with reference to FIG. 1 except that more pixels (or detectors) are illustrated. Still, in the imaging device 300 illustrated in FIG. 3 only some of the detectors or pixels are shown for not obscuring the drawing.

In particular, the imaging device 300 includes a detector 341 of the first set of detectors and four detectors 351-354 of the second set of detectors.

As illustrated in FIG. 3, the detectors 351-354 of the second set of detectors are covered by a filter 320 while the detector 341 of the first set of detectors remains uncovered (i.e. directly exposed). In the present example, the four elements or detectors (pixels) 351, 352, 353, 354 of the second set of detectors surround the element or detector (pixel) 341 of the first set of detectors. With the filter, electromagnetic radiation outside the second wavelength band is prevented from reaching the detector elements 351-354.

It will be appreciated that the filter may be a single filter layer which has been pixelated such that it only covers the detectors of the second set. The imaging device may therefore be obtained by covering a pixelated solid state sensor with a filter layer which is then subsequently processed such that only some of the pixels of the solid state sensors are covered by the filter, which thereby only receive radiation in another wavelength band than the uncovered pixels. This results in two different types of pixels which are sensitive to two different wavelength bands (namely the first wavelength band and the second wavelength band). Although in the present specification examples are provided for two different types of pixel, an imaging device including pixels of more than two types, i.e. pixels which are sensitive in several different (more than two) bands may be envisaged.

The manufacturing process for obtaining a pixelated filter may be performed in accordance with for instance two alternatives as described in the following.

According to a first alternative, a filter layer is first deposited on the surface of a solid state imaging sensor. Then, a masking layer may be applied on the deposited filter layer via photolithography such that the masking layer is patterned in accordance with the desired pattern of the filter. The filter layer may then be etched such that it is only removed from some pixels of the solid state imaging sensor because of the masking layer.

According to another alternative, a lift-off process may be used wherein the masking layer is first deposited (or applied) on the surface of the solid state imaging sensor (via photolithography) an then the filter layer is deposited on top of the masking layer. While removing the masking layer via e.g. etching, the filter layer will remain on the pixels of the solid state imaging sensor not protected by the masking layer. A pixelated filter layer is then obtained on top of the solid state imaging sensor.

While capturing an image, each one of the detectors 341 and 351-354 generates a signal. In the present illustration, the signals denoted 361, 371, 372, 373, and 734 originate from the detectors 341, 351, 352, 535, and 354, respectively. The signals 361, 371, 372, 373, 734 are input to a processing unit or readout circuit 380.

As mentioned above, the detectors 341 and 351-354 may be part of a two-dimensional array of elements including all the detectors of the first set and the detectors of the second set. The detectors (or pixels) may be arranged in a checker board pattern. In a similar way as described above, all pixel elements in the two-dimensional array can have a similar signal generation and readout.

The detectors 351-354 of the second set may each provide a reference signal corresponding to a background level of electromagnetic radiation within the second wavelength band. The expected value of the level of electromagnetic radiation in the third wavelength band may then be derived from one or more of such reference signals. For example, the expected value may be derived from a mean value of the four reference signals obtained from the detectors 351-354 of the second set. In particular, the expected value may correspond to electromagnetic radiation of a known spectral distribution in the third wavelength band, such as illustrated in for instance FIG. 2 with the expected behavior of the background environment.

The detector 341 may then generate a measurement signal from which a deviation of the level of electromagnetic radiation in the third wavelength band from the expected value, as determined above via the signals from the detectors 351-354 of the second set, may be detected. In particular, the deviation may be obtained by subtracting the measurement signal (or a corrected value of the measurement signal) generated by the detector 341 from the expected value, which may be a mean value (or a corrected mean value) of reference signals generated by at least some of, such as e.g. detectors 351-354, of the second set of detectors. If there is a deviation (i.e. if the result of the calculation is not zero or close to zero) then this means that there is a gas at the location corresponding to the pixel or detector 341.

In some embodiments, the imaging device may include an optical system (such as e.g. a lens, not shown) for altering optical focus in the image captured by the imaging device, i.e. to blur the captured image. The purpose of the optical system is to compensate for the spatial displacement between the detector 341 of the first set of detectors, from which a measurement signal is obtained, and the detectors 351-354 of the second set of detectors which provide the reference signals from which the expected value to be used for the detector 341 of the first set is derived. The captured image would become a bit unfocussed but the surrounding pixels providing the reference signals would receive electromagnetic radiation from substantially the same location in the observed environment as the pixel providing the measurement signal.

In some embodiments, an infrared imaging device such as described with reference to FIG. 3 may be part of an infrared camera.

In some embodiments, the imaging camera may also include an additional imaging sensor (not shown) sensitive to visible light. The combination of the two sensors is advantageous in that an image using visible light may be obtained onto which the "gas channel", as obtained by for instance the detector 341 of the imaging device 300 shown in FIG. 3, is added in the form of a pointer (red mark). The pointer would then indicate the presence and the position of the detected substance (e.g. a gas). The images captured by the two sensors may be synchronized so that their respective fields of view correspond to each other or at least overlap. The sensors may also be synchronized in time.

As the first wavelength band includes the absorption peak (or transmission or reflectance peak) of the gas (or the gases, in case there are several gases having similar absorption characteristics) to be detected and the second wavelength band is outside the absorption range of the gas to be detected, the signal from the detector or pixel 341 of the imaging device can use the surrounding pixels of the second set of detectors as a background reference such that presence of the gas can be detected. It may also be possible from the amplitude of the deviation to quantify, at least in a relative manner, the amount of gas detected in the pixel corresponding to detector 341. The amount of gas may be a function of the difference in amplitude between the signal obtained at the pixel of the first wavelength band and for instance a mean value of the closest (or surrounding) pixels of the second wavelength band. As such, each pixel of the first set of detectors corresponds to a gas channel indicating directly presence or not of a gas (or other substance) to be detected by the imaging device without requiring the need to identify the source of infrared radiation by further post-processing of the captured image. It will be appreciated that in some embodiments, a detector of the second set may participate in several calculations.

Figure 4:
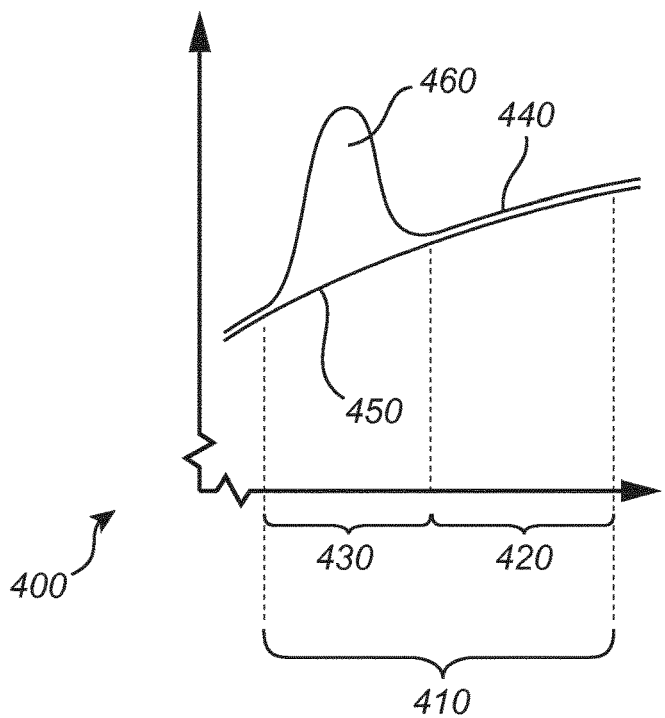
FIG. 4 is a graph explaining the function of an imaging device in accordance with an embodiment.
Figure 5:
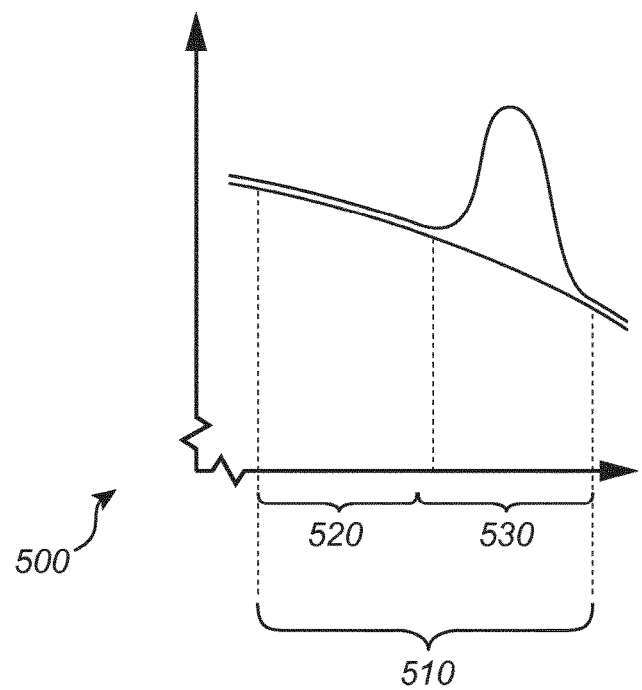
FIG. 5 is a graph explaining the operation principle of an imaging device in accordance with an embodiment.

FIGS. 4 and 5 show further graphs illustrating the operation principle of imaging devices in accordance with other embodiments.

The graph 400 shown in FIG. 4 is equivalent to the graph 200 shown in FIG. 2 except that it illustrates a deviation 460 from the expected behaviour 450 of the electromagnetic radiation in the third wavelength band providing an increase in amplitude instead of a decrease in amplitude. This may be the case if the substance or object to be imaged (or detected) emits, transmits or reflects infrared radiation within the third wavelength band at a higher level than what would have been obtained by the background without presence of the substance or object. In FIG. 4, the curve denoted 440 represents the behaviour in case of presence of a substance. Further, the first wavelength band is denoted 410 while the second wavelength band is denoted 420 and the third wavelength band is denoted 430. The second wavelength band represents a window corresponding to longer wavelengths of the first wavelength band.

The graph 500 shown in FIG. 5 is equivalent to the graph 400 shown in FIG. 4 except that it illustrates that the second wavelength band from which a reference signal may be obtained is positioned at lower wavelengths of the first wavelength band. In FIG. 5, the first wavelength band is denoted 510 while the second wavelength band is denoted 520 and the third wavelength band is denoted 530. The second wavelength band represents a window corresponding to lower wavelengths of the first wavelength band. It will be appreciated that this positioning of the second wavelength band relative to the first and the third wavelength band is beneficial if the Planck curve for the background electromagnetic radiation decreases as a function of higher wavelengths which may be the case for longer wavelengths or at higher temperatures.

Figure 6:
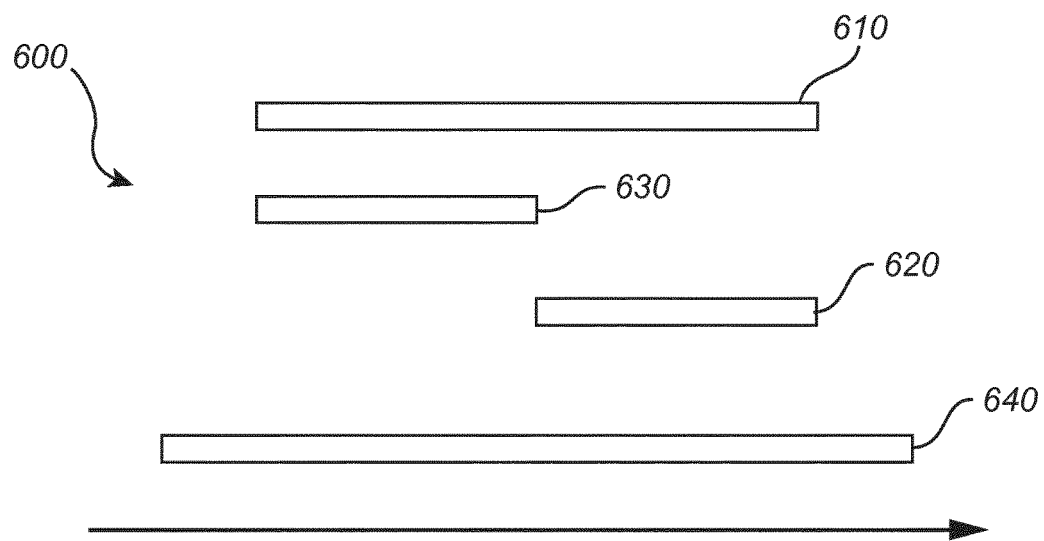
FIG. 6 is a schematic illustration of the wavelength band involved in an imaging device in accordance with an embodiment.

FIG. 6 schematically illustrates the positioning of the various wavelength bands that may be involved in an imaging device such as in the imaging devices 100 and 300 described with reference to FIGS. 1 and 3, respectively. In this schematic illustration, it is assumed that the imaging device also includes a global filter for determining the width of the first wavelength band. Such a global filter will be illustrated in FIG. 7.

In the illustration 600, the imaging device is shown to include a detector wavelength band 640 as determined by the sensitivity of the solid state detectors (such as for instance the detectors 341 and 351-354 shown in FIG. 3) forming the basic structure of the imaging device. As such, these detectors (both of the first set and the second set) may be sensitive to electromagnetic radiation within the detector wavelength band 640.

Via the global filter, however, only electromagnetic radiation within the first wavelength band 610 is allowed to reach the detectors (such as for instance the detectors 341 and 351-354 shown in FIG. 3) of the imaging device. In the present example, the detector wavelength band 640 is illustrated to extend outside the first wavelength band 610.

Further, the detectors of the second set (such as for instance the detectors 351-354 shown in FIG. 3) are covered by a filter which only allows electromagnetic radiation within the second wavelength band 620 to reach these detectors. The first set of detectors (such as detector 341 shown in FIG. 3) will thereby be responsive to electromagnetic radiation within the first wavelength band 610 and the second set of detectors (such as for instance the detectors 351-354 shown in FIG. 3) will be responsive to electromagnetic radiation within the second wavelength band 620.

The difference between the first wavelength band 610 and the second wavelength band 620 corresponds to the third wavelength band 630 within which the imaging device is configured to detect a deviation from an expected value. The second wavelength band 620 and the third wavelength band 630 are subsets of the first wavelength band 610. Although not necessary, in the present example, the second wavelength band 620 and the third wavelength band 630 have approximately the same wavelength width. Further, in the present example, the third wavelength band 630 is positioned at lower wavelengths of the first wavelength band 610 than the second wavelength band 620.

Figure 7:
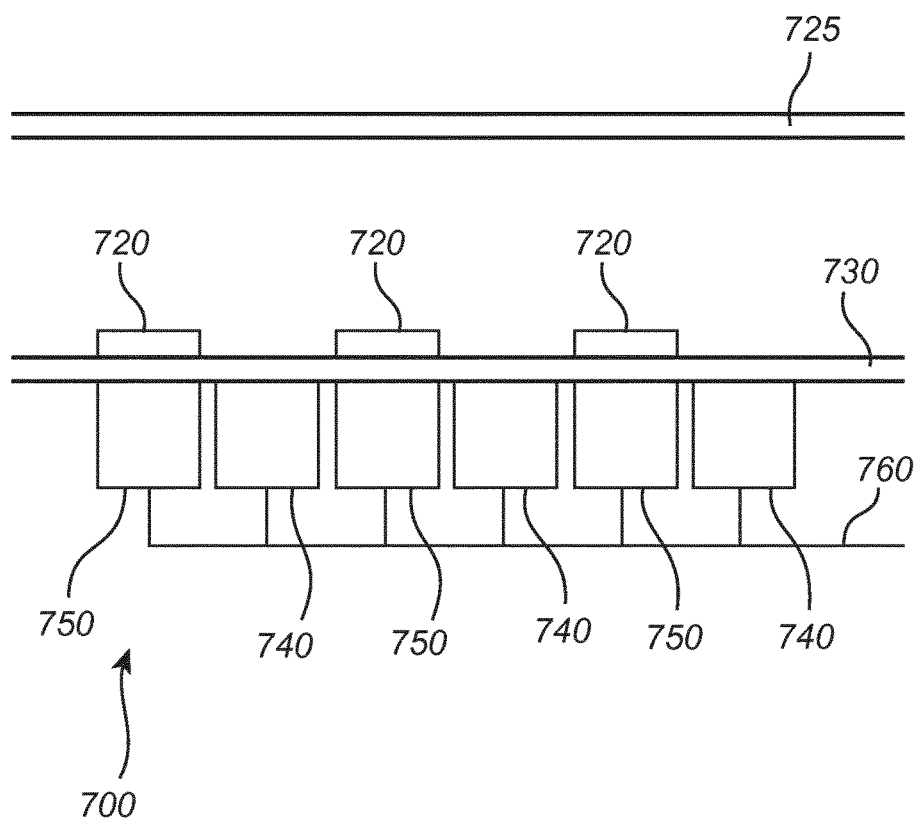
FIG. 7 is a cross-sectional view of an imaging device in accordance with an embodiment.

FIG. 7 shows a cross-sectional view of an imaging device according to an embodiment.

The imaging device 700 shown in FIG. 7 may be equivalent to any one of the imaging detectors 100 and 300 described with reference to FIGS. 1 and 3, respectively, except that it also comprises a global filter and an anti-reflecting coating which may be used to further adjust the wavelength bands and the sensitivity of the imaging device.

FIG. 7 may for instance represent a cross-sectional view along a row of the imaging device 300 shown in FIG. 3, such as for instance along the row including the detectors 351, 341, and 352. The imaging device 700 includes a first set of detectors 740 and a second set of detectors 750. An optional anti-reflecting coating 730 may be deposited on top of the first set 740 and the second set 750 of detectors. A pixelated filter 720, which may be manufactured such as described above with reference to FIG. 3, may be deposited on top of the optional anti-reflecting coating such that the detectors of the second set are covered the filter 720. In the present example, the filter 720 may be directly applied on the surface such that it is in direct contact with the detectors or with the optional anti-reflecting coating if there is any. The width of the first wavelength band may be determined by a global filter, which is a pass-band filter. The global filter 725 may be mounted separate from the first set and the second set of detectors (i.e. with a certain gap from the filter 720) in e.g. a detector module.

The first set of detectors and the second set of detectors (i.e. the pixelated solid state sensor) may be bounded on top a readout chip 760.

While specific embodiments have been described, the skilled person will understand that various modifications and alterations are conceivable within the scope as defined in the appended claims.

The invention claimed is:

1. An imaging device comprising:
    a first set of detectors responsive to infrared electromagnetic radiation in a first wavelength band;
    a second set of detectors; and
    a filter disposed above said second set of detectors to prevent registration of electromagnetic radiation outside a second wavelength band at said second set of detectors, wherein said second wavelength band is a subset of said first wavelength band; and
    wherein said imaging device is configured to detect a deviation from an expected value of a level of electromagnetic radiation in a third wavelength band based on signals obtained from the first set of detectors and the second set of detectors, wherein said third wavelength band is within said first wavelength band and outside said second wavelength band; and
    wherein at least one detector of the second set of detectors is configured to generate a reference signal corresponding to a background level of electromagnetic radiation in said second wavelength band, the expected value being derived from said reference signal which is scaled in accordance with a known dependence of the background level of infrared radiation in the second wavelength band, the expected value corresponding to background electromagnetic radiation in said third wavelength band.

2. The imaging device according to claim 1, wherein said expected value corresponds to background electromagnetic radiation of a known spectral distribution in said third wavelength band.

3. The imaging device according to claim 2, wherein said known spectral distribution corresponds to radiation from a black body radiator, a grey body radiator and/or a light source.

4. The imaging device according to claim 1, wherein at least one detector of the first set of detectors is configured to generate a measurement signal, the imaging device being configured to determine said deviation based on the expected value and the measurement signal.

5. The imaging device according to claim 1, wherein a deviation from the expected value indicates presence of a medium or substance within a field of view of the imaging device, said medium or substance having an absorption peak, a transmission peak and/or a reflectance peak within said third wavelength band.

6. The imaging device according to claim 1, wherein the imaging device is configured to detect an amount of substance or medium in that an amount of deviation from the expected value is indicative of an amount of substance or medium having an absorption peak, a transmission peak and/or a reflectance peak in said third wavelength band.

7. The imaging device according to claim 5, wherein said medium or substance is a gas.

8. The imaging device according to claim 1, wherein said second wavelength band represents a window corresponding to longer wavelengths of said first wavelength band.

9. The imaging device according to claim 1, wherein said second wavelength band represents a window corresponding to shorter wavelengths of said first wavelength band.

10. The imaging device according to claim 1, wherein the filter is configured to prevent electromagnetic radiation outside a second wavelength band from reaching said second set of detectors.

11. The imaging device according to claim 10, wherein the filter comprises a first filter layer determining an upper boundary of the second wavelength band and a second filter layer determining a lower boundary of the second wavelength band.

12. The imaging device according to claim 1, wherein the filter is configured to transmit electromagnetic radiation above a threshold wavelength determining a lower boundary of the second wavelength band, the upper boundary being determined by the upper boundary of the first wavelength band, or wherein the filter is configured to attenuate electromagnetic radiation above a threshold wavelength determining an upper boundary of the second wavelength band, the lower boundary being determined by the lower boundary of the first wavelength band.

13. The imaging device according to claim 1, wherein at least one of the upper boundary and the lower boundary of the first wavelength band is determined by the spectral sensitivity of the detectors of the first set and the second set.

14. The imaging device according to claim 1, further comprising a global filter disposed above said first set of detectors and said second set of detectors.

15. The imaging device according to claim 14, wherein the global filter is configured to determine at least one boundary of said first wavelength band.

16. The imaging device according to claim 1, wherein said first set of detectors and said second set of detectors are arranged in a two-dimensional array.

17. The imaging device according to claim 16, wherein said first set of detectors and said second set of detectors are arranged in a checker board pattern.

18. The imaging device according to claim 1, wherein said filter is an interference filter.

19. The imaging device according to claim 1, wherein said filter is positioned in contact with said second set of detectors.

20. The imaging device according to claim 1, further comprising an anti-reflecting coating disposed between said filter and said two-dimensional array.

21. The imaging device according to claim 1, wherein the device is configured to obtain said deviation by subtracting a measurement signal generated by a detector of the first set of detectors from a mean value of reference signals generated by at least some detectors of the second set of detectors surrounding said detector of the first set or by subtracting a measurement signal generated by a detector of the first set of detectors from a mean value of reference signals generated by detectors of the second set detectors surrounding said detector of the first set.

22. The imaging device according to claim 1, wherein the detectors of the first set of detectors and the second set of detectors are calibrated in order to compensate for variation in gain and/or offset.

23. The imaging device according to claim 1, wherein the second wavelength band covers approximately half of the width of the first wavelength band.

24. The imaging device according to claim 1, wherein the first wavelength band extends from approximately 3.2 micrometers to approximately 3.8 micrometers while the second wavelength band extends from approximately 3.5 micrometers to approximately 3.8 micrometers or wherein the first wavelength band extends from approximately 10.3 micrometers to approximately 10.7 micrometers while the second wavelength band extends from approximately 10.3 micrometers to approximately 10.5 micrometers.

25. The imaging device according to claim 1, wherein the second wavelength band is positioned relative to the first wavelength band such that a contribution of a background level of electromagnetic radiation in a signal obtained for said second wavelength band is approximately equal to a signal level obtained for said third wavelength band.

26. The imaging device according to claim 1, further comprising an optical system for altering optical focus in an image captured by the imaging device.

27. An infrared camera comprising an imaging device as defined in claim 1.

28. The infrared camera according to claim 27, further comprising an additional imaging sensor sensitive to visible light.

* * * * *